Dec. 16, 1958 G. W. HOBBS 2,864,557

NUMBER CONVERTER

Filed Dec. 13, 1954 2 Sheets-Sheet 1

Inventor:
George W. Hobbs,
by Claude A. Mott
His Attorney.

Dec. 16, 1958 G. W. HOBBS 2,864,557

NUMBER CONVERTER

Filed Dec. 13, 1954 2 Sheets-Sheet 2

Inventor:
George W. Hobbs,
by [signature]
His Attorney.

United States Patent Office 2,864,557

Patented Dec. 16, 1958

2,864,557

NUMBER CONVERTER

George W. Hobbs, Scotia, N. Y., assignor to General Electric Company, a corporation of New York Application December 13, 1954, Serial No. 477,325

12 Claims. (Cl. 235—61)

Figure 1:
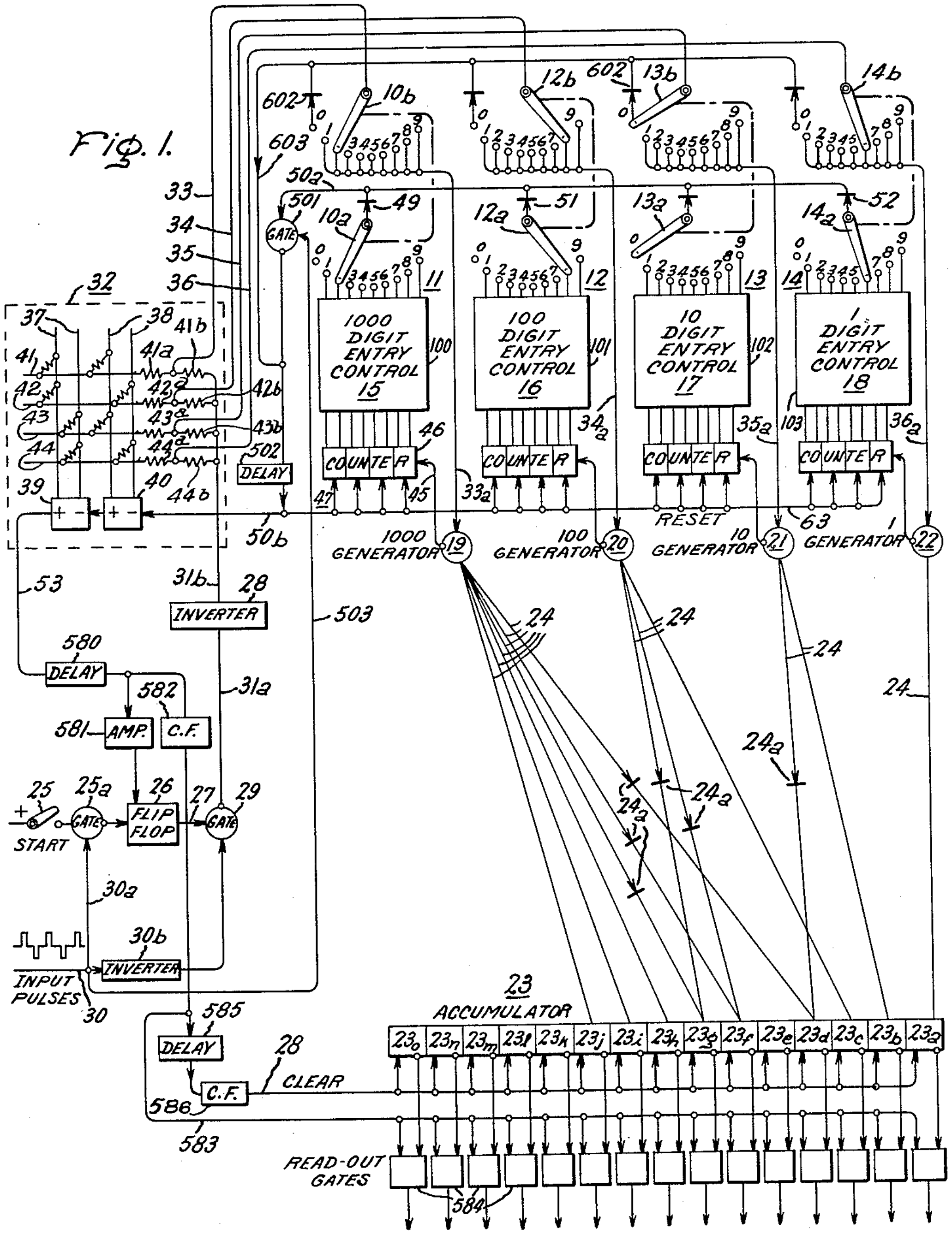

This invention generally relates to electronic digital calculating devices and more particularly to the portions of such devices for converting a number expressed in one radix to that of another, such as decimal-to-binary number converters.

With the ever increasing reliance being placed upon digital calculating machines to solve longer and more complex mathematical problems has resulted the evolution of calculators of immense size having many thousands of parts and consuming tremendous quantities of power. Various means of simplifying the numerous and diversified arithmetic processes performed by these machines have long been sought, and it has been previously determined that the circuitry for performing these arithmetic functions may be greatly simplified in many instances by performing computations in the binary number system rather than in the decimal or other number system.

The representation of a number in binary notation, however, has the disadvantage of requiring more than three times as many digits as the representation of the same number in decimal notation. This fact coupled with the general familiarity in dealing with numbers in decimal form, makes it more desirable and expedient for the human operator to initially enter the problem in decimal form into the machine and provide a means within the machine itself for converting this number into binary notation prior to performing the calculating functions. Such means have been termed by those skilled in the art as radix converters and where the number data in decimal form is converted into binary form, as decimal-to-binary converters.

In a prior application of the same inventor, Serial No. 399,283, filed December 21, 1953, there is disclosed and claimed an apparatus for automatically and substantially instantaneously converting a number represented in binary notation to decimal notation. In this apparatus the number represented in binary notation is initially entered into the device and stored therein, and thereafter this number is divided automatically and successively by the binary equivalent of each order of a tens integral number, beginning with the highest order tens number dividable therein successively down to the lowest order tens number. For example, assuming the number to be converted is the binary equivalent of 1324, it is initially divided by the binary equivalent of the highest order integral tens multiple number, which in this instance is the binary equivalent of 1000, to yield a quotient of 1 and the remainder equal to the binary equivalent of 324. The binary remainder equivalent to 324 is then divided by the binary equivalent of the second highest order integral tens multiple number which is the binary equivalent of 100 to yield a quotient of 3 and the remainder equal to the binary equivalent of 24. This process is automatically continued until the originally entered binary number is divided by all of the integral tens multiple numbers contained therein, and upon completion of these division operations, the various quotients derived from this process, in this instance, being 1, 3, 2, 4, to represent the desired decimal number 1324.

In accordance with the preferred embodiment of the present invention, a decimal-to-binary converter is provided and this process is varied and the operations effectively reversed, for instead of successively dividing a given binary number by the various integral tens multiple numbers, the binary equivalents of these various tens integral numbers are successively added in an accumulator a repetitive number of times corresponding to the desired decimal number to be converted. For example, again taking the number 1324, the highest order tens integral number contained therein, 1000, is initially converted into its binary equivalent form and added into an accumulator a total of one time. Then the second highest order tens integral number, 100, is converted into its binary equivalent form and entered into the accumulator a total of three times, with the result that upon completion of the second series of operations, the accumulator contains a total count equal to the binary equivalent of 1300. After the completion of the second series of operations, the third highest tens integral number, 10, is converted into its binary form and added into the accumulator a total of 2 times, and finally the lowest order tens integral number, 1, is converted into binary form and added into the accumulator four times. Upon the completion of this fourth series of operations, the total binary number standing in an accumulator constitutes the binary equivalent of the decimal number 1324.

It is accordingly one object of this invention to provide a high speed device for converting a number expressed in radix 10 to radix 2.

A further object is to provide a high speed automatically operating decimal-to-binary converter having no moving parts.

A still further object is to provide an improved device for translating a number expressed in one radix to that of another.

Other objects and many attendant advantages of this invention will be more readily comprehended to those skilled in this art upon a consideration of the following detailed description of one embodiment of the invention taken in conjunction with the accompanying drawings wherein:

Fig. 1 functionally illustrates an apparatus incorporating one embodiment of the invention partially in block diagram form.

Figure 2:
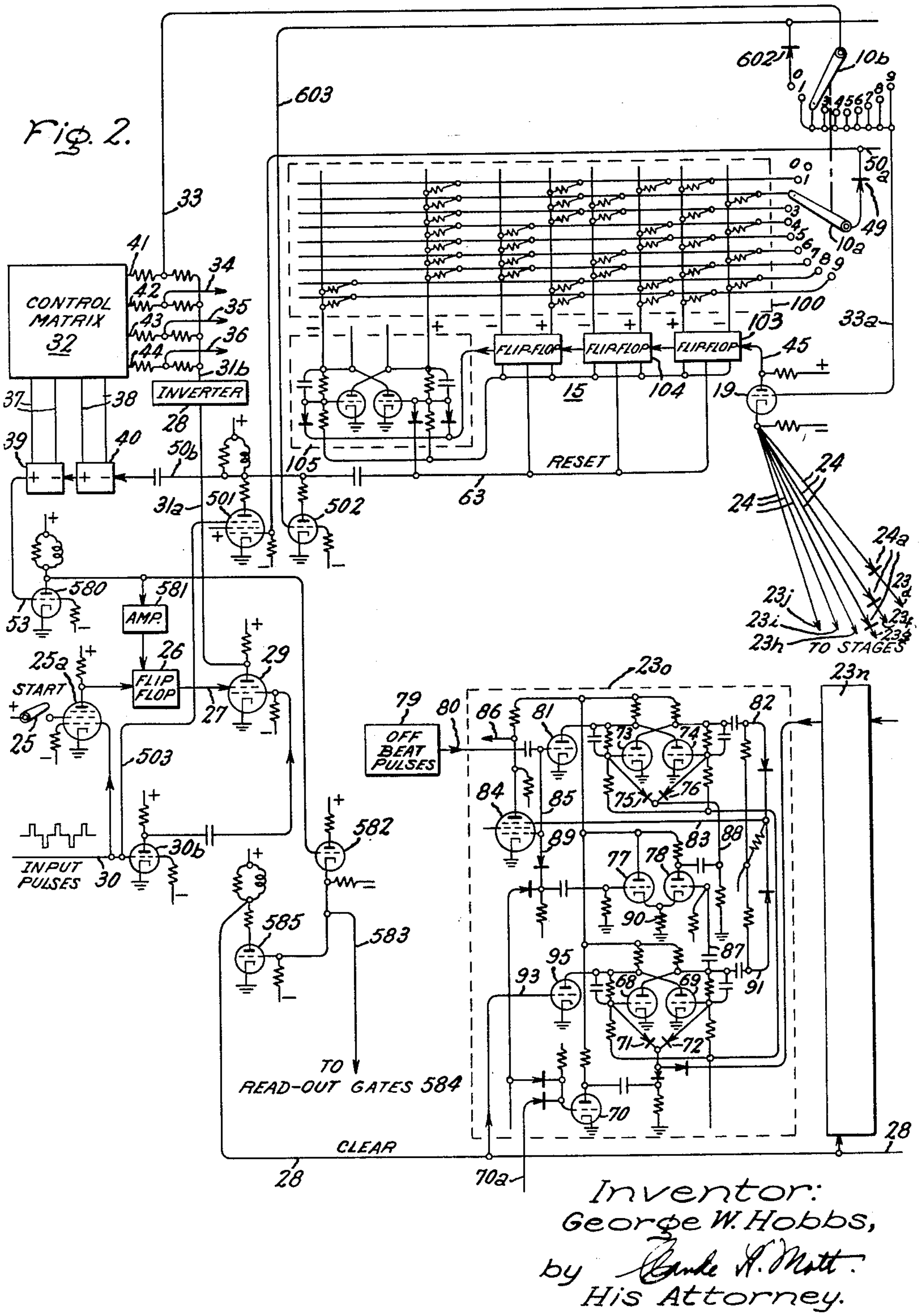

Fig. 2 illustrates the preferred circuitry for this embodiment in schematic form.

Prior to commencing a detailed description of a preferred embodiment of the invention, a more thorough comprehension thereof may be had by initially considering by way of example the mathematical basis for the operations performed. Considering that any five digit decimal number $a, b, c, d, e$, may be expressed as:

$$a\times 10^4+b\times 10^3+c\times 10^2+d\times 10^1+e10^0$$

which is effectively the sum of the following four products in a decimal digit $e$, $$(a\times 10^4)+(b\times 10^3)+(c\times 10^2)+(d\times 10)+e$$

The binary equivalent of this number may be found by initially determining the binary equivalent of each above product and that of digit $e$, and thereafter summing these binary products. The binary equivalent of each of the above products may in turn be obtained by determining the binary equivalent of each of the digits $a, b, c, d, e$, and thereafter multiplying this binary number by the binary equivalent of its associated integral tens multiple number. That is, multiplying the binary equivalent of $a$ by the binary equivalent of $10^4$ or 10,000, and so forth.

Inasmuch as the binary equivalent of each above integral tens multiple number is known as follows:

| Decimal: | Binary |
|---|---|
| $10^0$ or 1 | 00000000000001 |
| $10^1$ or 10 | 00000000001010 |
| $10^2$ or 100 | 00000001100100 |
| $10^3$ or 1000 | 00001111101000 |
| $10^4$ or 10,000 | 10011100010000 |

This process may be performed by multiplying each of the binary equivalents of the various tens integral numbers by its associated digit as follows:

$$(a\times 10011100010000)+(b\times 1111101000)+(c\times 1100100)+(d\times 1010)+(e\times 1)$$

Since the only quantities that vary for each number conversion operation are the numerical values of the decimal digits *a, b, c, d,* and *e*, any decimal number may be expressed or converted to its binary form by generating the binary form of the highest order tens integral number thereof, 10,000 in this instance, and repetitively adding this number into a summing device a number of times corresponding to the digit *a*. Thence, generating the binary form of the second highest order tens integral number, 1,000, and repetitively adding this number in the summing device a number of times corresponding to the second digit *b*, and thence generating the binary form of the third highest tens integral number, 100, and repetitively adding this number into the summing device a total number of times corresponding to the third digit *c* and so forth. Upon the completion of all of these series of operations, the total binary number added by the summing device is the binary form of the originally entered decimal number *a, b, c, d, e*.

Referring now to the block diagram of Fig. 1 for an over-all consideration of one preferred embodiment of the invention operating in accordance with the above process which has for purposes of simplicity been shown as a converter for translating any four digit decimal number to its binary form, the four digit decimal number *a, b, c, d* is initially entered into the machine by adjusting the ganged contactors 10*a* and 10*b* of the highest order switch bank 11 to their number position corresponding to the first decimal digit *a*; then setting the next lower order ganged contactors 12*a* and 12*b* to their number position corresponding to the second decimal digit *b*; then setting the succeeding lower order contactors 13*a* and 13*b* to their number position corresponding to the third decimal digit *c*; and finally setting the last and lowest order contactors 14*a* and 14*b* to their number position corresponding to the last decimal digit *d*. Each of these banks of switches presets a different decimal digit entry control circuit generally designated 15, 16, 17, and 18, each of which is in turn connected to control the number of operations of a corresponding different one of four generators 19, 20, 21, and 22 that are adapted to transmit the binary equivalent of each of the various orders of a multi-order tens multiple number. That is, generator 19 is adapted to transmit the binary equivalent of the decimal 1,000 or impulses representative of the binary number 00001111101000; generator 20 is adapted to transmit the binary equivalent of 100 or 00000001100100; generator 21 is adapted to transmit the binary equivalent of 10 or 00000000001010; and finally generator 22 is adapted to transmit the binary equivalent of 1 or 00000000000001. The impulses generated by each of these generators are transmitted to preselected stages of a summing accumulator 23 or other suitable summing devices over a plurality of output lines 24 leading from each generator to the various stages of the accumulator. Thus, whenever generator 19 is energized, a plurality of impulses are directed over lines 24 connected thereto to the various preselected stages of the accumulator 23 to additively enter the binary equivalent of the tens integral number 1,000 in the accumulator.

Similarly, for each energization of generator 20, the binary equivalent of the decimal number 100 is added in the accumulator, and for each energization of generators 21 and 22, the binary equivalent of the decimal number 10 and the decimal number 1, respectively, are entered additively into the accumulator.

The remainder of the system illustrated in the left of the figure generally comprises the program and control circuitry for energizing each of said number generators, in turn, to continuously and repetitively enter the binary equivalent of its integral tens number into said accumulator a number of times corresponding to the setting of its associated digit entry control switches. Thus, the highest order number generator, 19, repetitively transmits the binary equivalent of the decimal number 1,000 into the accumulator stages a number of times as determined by the setting of its digit entry control switches 10*a* and 10*b*. After this first sequence of operations has been completed, the second highest order generator 20 repetitively transmits the binary equivalent of the decimal number 100 into the accumulator a number of times corresponding to the setting of its digit entry control switches 12*a* and 12*b*; and thence in sequence each of the remaining order generators transmits repetitive series of impulses corresponding to the settings of their digit entry control switches in descending order until all of the generators have completed their operations. Upon the completion of the sequential operation of all generators, the resulting binary number standing in the stages of the accumulator constitutes the sum of all the transmitted impulses from the generators; and as illustrated by the mathematical process given above, this sum equals the binary form of the original decimal number.

Considering now the programming circuitry and the detailed operation of the system, after the various digits of the decimal number to be converted have been entered by setting the switch banks 11–14 to their proper positions, a start switch 25 is closed injecting a positive potential to open a gate circuit, generally designated 25*a*. Opening gate 25*a* permits the next positive pulse from a repetitive energizing source (not shown) to be conveyed over line 30 and upwardly over line 30*a* through gate 25*a* to a flip-flop controlling circuit 26. This positive pulse reverses the conducting condition of this circuit and output line 27 thereof becomes more positive. Establishing line 27 more positive, opens a gate 29 permitting the next negative pulse and all subsequent negative pulses from the repetitive energizing source to be conveyed over input line 30 through an inverter circuit 30*b* and thence through gate 29 and upwardly over input line 31*a* and through a second inverter circuit 28 to a line selector circuit generally designated 32.

Line selector 32 comprises a circuit for enabling the impulses over matrix input line 31*b* to be selectively directed over any one of output lines 33, 34, 35, 36, thereof, thereby to energize any one of the number generators 19, 20, 21, 22 as desired. Consequently, should output line 33 be exclusively selected, impulses received over matrix input line 31*b* are directed over line 33 and through switch 10*b* (assuming it is in any one of its 1–9 positions) to repetitively energize number generator 19 over line 33*a* and thereby enable repetitive entry of 1,000 (in binary form) into the accumulator. Similarly should output line 34 be exclusively selected, impulses received over matrix input line 31*b* are directed over line 34 and through switch 12*b* (if in its 1–9 position) to repetitively energize number generator 20 over line 34*a* and thereby enable the repetitive entry of 100 (in binary form) into the accumulator.

For enabling the exclusive selection of any one of these output lines, line selector 32 may be comprised of a control matrix, as shown, having two pairs of vertically arranged control lines 37 and 38, each pair being variably energized by the condition of a different one of two double stability state flip-flop circuits generally designated 39 and 40. Connected to these vertically arranged control lines 37 and 38 by a predetermined arrangement of diodes, or resistors as shown, are four horizontally arranged lines 41, 42, 43, and 44, each associated with a different output line 33, 34, 35, and 36, respectively, by a first summing resistor 41*a*, 42*a*, 43*a*, and 44*a*, respectively. For each of the four possible conducting conditions of the two cascaded flip-flop circuits 39 and 40, the arrangement of this matrix permits one of the horizontal lines 41, 42, 43, or 44 to be positively energized and the others to be more negatively energized. This positive energization in effect conditions a related number generator input line to receive the input pulses received over line 31 through a second summing resistor 41*b*, 42*b*, 43*b*, and 44*b*, respectively, as shown, whereupon source generated impulses conducted over matrix input line 31*b* are directed over this conditioned line to energize the related number generator. Referring to Fig. 1 for an illustrative example, flip-flop circuits 39 and 40 are each shown conditioned to their zero (0) or off position, that is, the left-hand line of each pair of vertically extending output lines connected thereto is positively energized relative to the right-hand line. Following these positively energized vertical lines through the matrix, it is observed that only the uppermost horizontal line 41 thereof is connected with both positive lines, whereas the remaining three horizontal lines are connected to at least one of the more negatively energized vertical lines. Consequently with flip-flop circuits 39 and 40 both in this zero condition, number generator input line 33 is the only line conditioned to receive the input pulses conducted over line 31*b*. Following this procedure for other conditions of control flip-flop circuits 39 and 40, it may be readily observed that for each succeeding different condition of the flip-flop circuits, the next succeeding number generator input line is conditioned to pass input pulses. That is, for flip-flop circuit 40 in the one condition and 39 in the zero condition, (+ −)(− +), number input line 34 is conditioned to enable input pulses to energize number generator 20, etc.

Thus, the closing of start switch 25 enables a series of input impulses to be directed upwardly over line 31*b* to ultimately initially energize the highest order number generator 19 over line 33*a*, and for each impulse received over line 31*b* and passing through line selector 32 and thence over lines 33 and 33*a* to generator 19, a series of impulses are transmitted to preselected stages of accumulator 23 adding the binary equivalent of decimal number 1,000 thereto.

For controlling the number of operations of 1,000's generator 19 in accordance with the desired decimal digit of that order to be converted, each impulse energizing 1,000's generator 19 over line 33*a* is also directed upwardly over line 45 to enter the first stage 46 of a four stage counter 47 constituting a part of the 1,000 digit entry control circuit 15. Each time the 1,000's generator 19 is energized and transmits a series of pulses to the stages of accumulator 23 representing the binary form of decimal 1,000, the four stage counter 47 sums one pulse and after a predetermined number of pulses have been summed as determined by the setting of digit entry control switch contact 10*a* (position 2 as shown in Fig. 1), a control impulse is transmitted upwardly through the digit entry control circuit 15, through switch contact 10*a* and diode 49 to line 50*a* where it is directed downwardly through a gate 501 and a delay circuit 502 and over line 50*b* to both change the conducting condition of matrix control flip-flop circuits 39 and 40 and reset counter 47 to its zero counting condition by passing over reset line 63. To insure that counter 47 is not cleared prematurely, gate 501 also receives the next positive pulse over line 503 from the source and the coincident combination of the pulses enables the resetting of counter 47 at the proper time. Changing the condition of control flip-flop circuit 40 results in the matrix selecting the second number input line 34 for receiving the next series of recurring impulses from line 31*b*, thereby directing these following input impulses to the next lower order number generator 20 rather than the generator 19. Thereafter, the next succeeding impulses received over line 31*b* and directed upwardly through the line selecting matrix circuit 32 are directed over line 34 and ultimately to number generator 20 through switch contact 12*b* (if in its 1–9 position) and number generator 20 thereupon transmits the binary equivalent of decimal number 100 into the accumulator. This second series of operations is successively continued in the same manner as before until the 100's generator 20 has performed the number of operations called for by the setting of its switch contacts 12*a* and 12*b* (eight operations as shown in the figure), whereupon a controlling pulse is directed upwardly through the digit entry control 16, through movable contactor 12*a* and diode 51 to the matrix control line 50*a* to again change the conducting condition of matrix flip-flops 39 and 40 and commence the energization of the next lower order generator 21. The above process is similarly continued order-by-order in time sequence until the lowest order number generator, in this instance being the units generator 22, has completed its predetermined series of operations, and a control pulse therefrom is generated over matrix control line 50*a* as before. However, in this latter instance, the matrix control flip-flops 39 and 40 have by this time received four transfer impulses and flip-flop 39 therefore generates an output impulse over line 53 that is then employed to terminate the operation of the complete system by being directed downwardly through a delay circuit 580 and amplifier 581 to the start-stop flip-flop control circuit 26. Upon receiving this stop pulse, flip-flop 26 again reverses its conducting condition making line 27 thereof more negative. The more negative potential on line 27 then closes gate circuit 29 preventing the input pulses on line 30 from passing upwardly and energizing the various number generators, thus, effectively terminating operation of the system. This stop pulse over line 53 is also directed downwardly through a cathode follower circuit 582 and thence follows two paths. In the first path, the stop pulse is directed downwardly over line 583 to open a series of gate circuits 584, one for each of the accumulator stages, and transfer the number in the accumulator stages through the gate circuits to a storage register or the like (not shown) for permanently recording the number. In the second path, this stop pulse is passed through a delay circuit 585 and cathode follower circuit 586 to enter the clear line 28 of accumulator 23, thereby injecting a positive pulse into all stages 23*a*–23*o*, inclusive, that operates to return all stages to their zero or off condition.

The above illustration has been for the instances where all of the decimal digits *a*, *b*, *c*, *d*, of the number to be converted into binary form are any number from 1 to 9. However, in the event that any one or more of these digits are 0; as for example the second digit in the number 3016, it is necessary to eliminate or by-pass the energization of the number generator associated with that digit and switch the control matrix 32 to the next lower number generator. This is preferably accomplished by disconnecting the zero (0) contact of each of the digit entry switch controllers 10*b*, 12*b*, 13*b*, and 14*b*, respectively, from the related number generator and instead connecting this zero contact to a suitable by-pass circuit operating to switch the matrix controller to select the next lowest order number generator. Returning to Fig. 1 and referring to the 10's digit entry control switch 13*b* for an illustration of this preferred circuit, the first impulse being conveyed over line 35 from the controlling matrix 32 is directed over contactor 13*b* to the zero (0) terminal. After reaching this zero terminal, it is directed upwardly through a diode or rectifier 602 to a by-pass line 603 and thence conveyed over by pass line 603 backwardly and downwardly through delaying circuit 502 to matrix switching line 50*b* where it is employed to switch matrix 32 to the next lower order succeeding number generator 22 thereby by-passing the 10's number generator, as desired.

Referring now to Fig. 2 for a detail understanding of some of the preferred circuitry employed in the present invention.

*Accumulator*

Accumulator 23 may be basically comprised of a plurality of identical binary summing stages 23*a*–23*o*, inclusive, in cascaded connection, each stage adapted to count two impulses and after receiving the second consecutive impulse to generate a carry-over impulse to the next succeeding stage. For summing these impulses, each stage may include an on-off flip-flop adding device such as the Eccles-Jordan connected back-to-back tubes 68 and 69 adapted to alternately conduct in response to consecutive input pulses applied to their control grids. An isolating tube 70 may be provided for receiving these input pulses over the control grid thereof and transmitting these pulses from the plate circuit thereof to the junction of two rectifier or diode elements 71 and 72 feeding the control grids of counter tubes 68 and 69. Thus, for any positive pulse transmitted to the control grid of mixer tube 70 over input line 70*a*, add flip-flop tubes 68 and 69, coincidently receiving this pulse, reverse their then conducting condition to add the number one to the sum stored therein.

For enabling the second function performed by these stages to be effected, that of carry-over from each stage to the next stage after receiving the second input pulse therein; a second flip-flop circuit, hereinafter termed the carry flip-flop and comprising tubes 73 and 74, may be provided. This carry flip-flop circuit may be identical to the add flip-flop circuit, as shown, and therefore each pulse transmitted to the junction of diodes 75 and 76 operates to reverse the conducting and non-conducting condition of tubes 73 and 74, respectively.

Inasmuch as the entry of impulses over input lines 70*a* to the various stages 23*a*–*o* of accumulator 23 are effected simultaneously, the carry-over pulses from stage to stage are preferably effected in the time interval occurring between said input pulses to thereby prevent interference between input and carry-over pulses. For this purpose gating means including tubes 77 and 78 may be provided intermediate the add and carry flip-flop circuits to isolate these devices during the carry process, and a source of off-beat impulses 79, generating a continuous sequence of carry clear pulses occurring in time sequence intermediate the add pulses, may be provided to initiate this carry-over process. Thus, during the time interval between add pulses, positive carry clear pulses which may be generated by a separate off-beat or out of phase pulse source 79 are directed over line 80 to the control grid of a trigger tube 81 and thence from the plate of tube 81 to the control grid of flip-flop tube 73. If tube 73 is conducting, indicating the storage of a digit to be carried over, the negative pulse from trigger tube 81 returns tube 73 to a non-conducting condition, thereby returning the carry flip-flop to a zero condition and enabling the generation of a positive carry pulse from the plate of tube 73 over lines 82 and 83 to the suppressor grid of a carry gate tube 84. In addition, the carry clear pulse over line 80 is simultaneously conducted downwardly over line 85 to the control grid of carry gate tube 84 thereby rendering gate tube 84 open and allowing this carry pulse to pass through to the plate of carry gate tube 84 and thence over line 86 to the add flip-flop tubes 68 and 69 of the next succeeding stage.

As discussed above, the isolation gate circuit, including tubes 77 and 78, is provided to enable the transfer and storage of a pulse from the add flip-flop to the carry flip-flop while isolating these circuits during the interstage carry-over operation. This transfer is performed for each second consecutive pulse received by the add flip-flop, as the conducting condition of tube 68 indicating the count of one, is rendered non-conducting by receiving the second add pulse, thereby generating a positive pulse over line 87 to the control grid of gate tube 78. If the associated gate tube 77 is then non-conducting, a negative pulse is transmitted from the plate of tube 78, thence to both control grids of carry flip-flop tubes over line 88 to render carry flip-flop tube 73 conducting and thereby store the carry pulse. During the interval before the next succeeding add pulse is received by the add flip-flop, this stored carry-over pulse is transferred to the next succeeding stage and the carry flip-flop is simultaneously returned to its zero condition (tube 74 conducting). The positive carry clear pulse from off-beat source 79 effecting this transfer is also employed to simultaneously close gate tube 78 during the carry-over operation by being directed downwardly over lines 85 and 89 to the control grid of tube 77, thereby rendering tube 77 conducting. As tube 77 conducts, the current flowing through cathode resistor 90, common to tubes 77 and 78, provides a negative bias cutting off conduction of gate tube 78, thereby isolating the add flip-flop from the carry flip-flop during the interstage carry-over operation.

The interstage carry-over pulse being conducted over line 86 of one stage to the add flip-flop of the next succeeding stage reverses the then conducting condition of this latter add flip-flop. However, should the add flip-flop of the next succeeding stage have a pulse stored therein or be in the one condition (tube 68 conducting), the receipt of the carry-over pulse results in the return of this flip-flop to the zero condition (tube 69 conducting) and the generation of a second positive carry-over in the plate of tube 68 of this next stage. This second carry-over pulse is then propagated over lines 91 and 83 to the suppressor grid of carry gate tube 84, resulting in the transfer of this second carry pulse to the next in line succeeding stage in the same manner as the first carry-over pulse.

The remaining function of clearing the various stages of the accumulator is rather simply performed by this preferred circuitry inasmuch as the operation of clearing all of these stages involves merely returning all add flip-flops to the zero condition (tube 69 conducting). For clearing all stages to the zero condition after the completion of all operations, the positive clear pulse generated over line 28 is directed upwardly over line 93 and through clear gate tube 95 to the control grid of add flip-flop tube 68 alone, rather than jointly to the control grids of both add flip-flop tubes 68 and 69. By being directed to only tube 68, this connection insures that only tube 68 is rendered non-conductive, and consequently, establishes conduction through tube 69 (zero conduction tube) in all stages of the accumulator.

*Number generators and digit entry controls therefor*

The number generators 19, 20, 21, and 22, as shown, are preferably comprised of single tube cathode follower circuits having the control grid elements thereof connected in sequence to the output lines 33*a*, 34*a*, 35*a*, and 36*a*, respectively, and having the cathode elements thereof each connected to the inputs of a predetermined array of accumulator stages. For each input pulse directed through the selector matrix 32 to the control grid of any one of these cathode follower tubes, impulses are accordingly transmitted from the corresponding cathode element thereof to the inputs 70*a* of various stages of the accumulator 23, as shown.

The various digit entry control circuits 15, 16, 17, and 18 each comprise presettable predetermined counters for counting the number of operations of a related number generator and for generating an output impulse when the preselected number of operations of each generator has been performed. Each of these predetermined counter circuits may comprise any high speed pulse counting device known in the art; and as shown by Fig. 2, are preferably comprised of four cascaded stages of Eccles-Jordan connected triode vacuum tubes, each stage being responsive to carry-over pulses from a preceding stage and being resettable to a zero condition by a resetting pulse received over line 63 from gate 501. Inasmuch as the circuitry and operation of these binary counters is well known in the present stage of the art, a further description of these circuits is believed unnecessary.

For preselecting any number of counts from these counter circuits, in accordance with the setting of the movable contactors 10*a*, 12*a*, 13*a*, and 14*a*, a plurality of matrices 100, 101, 102, and 103 (Fig. 1), may be employed; such as the eight input line ten output line matrix schematically illustrated within the dotted box 100 in Fig. 2. In this arrangement, the on-off condition of each of the binary counter stages is translated to the combined decimal count thereof by connecting the plate circuit of each counter flip-flop tube in a predetermined arrangement to the nine output lines of the matrix consecutively numbered 0–9, inclusive. As the stages sequentially vary their on-off condition in response to succeeding counts, each of the matrix output lines, in numerical order, is sequentially energized with a more positive voltage than the others; and therefore, by setting the movable contactor switch to any one of these lines, it receives a positive impulse on that preselected number of counts being received by the associated counter circuit. For example, considering the 1000's digit entry control circuit in Fig. 2, and assuming that each of the counter stages excepting the first stage 103 are in their zero or off condition indicating a count of one, the right-hand tube of each of the off flip-flop circuits is more positive than the left-hand tube as shown by the plus and minus signs adjacent the vertical lines leading from each flip-flop into the matrix 100 and the left-hand line of the first stage 103 is more positive than the right-hand line. Following these lines upwardly into matrix 100, it is observed that only the uppermost horizontal line of the matrix, line number 1, is connected by means of the diodes or resistors shown to all of these more positive vertical lines, whereas every other horizontal numbered line of the matrix is connected to at least one of the more negative lines leading from the flip-flop stages. Under this condition, only the uppermost horizontal line labeled "Time One" or "Count One" is adapted to transmit an impulse to contactor 10*a* and assuming that contactor 10*a* were set in its "1" position rather than in its "2" position as shown, this transmitted impulse then would pass through the contactor and upwardly over line 50*a*.

After receiving three impulses from number generator 19, the first and second stages of the counter numbered 103 and 104, respectively, have both reversed their conducting condition resulting in the left-hand output line of each of these two stages being more positive than the right-hand output line and the remaining two stages being in the same condition as shown in the drawing. Tracing these vertical lines upwardly into the matrix again, it is observed that after receiving this third count, only the horizontal output line numbered 3 of matrix 100 is now connected to all the more positive lines and therefore after receiving this third impulse, an impulse then would be transmitted over output line 3 through movable contactor 10*a* upwardly over line 50*a* if the contactor 10*a* were set in its "3" position. Thus, it is observed that the combination of counter stages, count matrix and movable contactor provide a means for selecting any given number of operations of the various number generators and transmitting an impulse to terminate the operation of that number generator after the completion of that predetermined number of operations.

For purposes of simplification, the schematic circuitry for flip-flop control circuit 26 and matrix flip-flop circuits 39 and 40 have not been separately shown and described.

However, the circuitry for such double stability state circuits is well known in the art and may be of the same form as the illustrated counter circuit 105 shown in Fig. 2. The various gate circuits 25*a*, 29, and 501, as shown in Fig. 2, may take the form of a pentode vacuum tube, as shown, having the received pulses directed to its control grid and transmitted from its plate element. For controlling the conduction of this tube or determining whether the gate is opened or closed, the controlling potential may be conveyed to one of the control grids of this pentode to thereby permit the transmission of these impulses through the tube or prevent such transmission depending upon the potential of this grid.

The amplifier circuit 581 for amplifying the stop impulse sufficiently to positively trigger flip-flop 26, and the cathode follower circuit 582 for coupling this stop pulse to a delay circuit 585 are well known in the art as are the inverter circuits 30*b* and 28, which merely reverse the polarity of pulses passing therethrough. The delay circuits generally designated 580 and 585 both preferably comprise triode vacuum tubes having negatively biased control grids and having a parallel circuit including an inductance and resistor in the plate circuit thereof. Upon receiving a positive pulse, the plate voltage thereof drops as current passes through the tube, resulting in a change of potential across the plate inductance. This change of potential thereafter results in a delayed positive pulse being generated at the plate element; and this delayed positive pulse is subsequently used for the function enumerated above. The combined gate circuit 501 and delay circuit 502 preferably comprise a combination of this delay circuit and a pentode gate circuit obtained by connecting both the plate of the pentode gate tube 501 and the plate of the delay tube 502 together through suitable resistors and connecting their junction to this inductor-resistor parallel circuit. Should the gate pentode 501 coincidently receive positive potentials on its control grid and suppressor grid from lines 50*a* and 503, a delayed positive pulse is generated by the plate circuit thereof due to the action of the inductor. Similarly, should the control grid of the delay triode tube 502 alternately receive a positive impulse over line 603, a similarly delayed positive impulse is directed from its plate element to line 50*b*, as desired.

Although for purposes of illustration, the above preferred embodiment of the invention has been disclosed as a system for converting a relatively small decimal number of four digits to its equivalent binary form, the capacity of this system, of course, is not limited to any such range of numbers; for by the addition of more stages to accumulator 23, more number generators and digit entry control circuits, and a greater capacity line selector, it is obvious that many higher order numbers may be readily and substantially instantaneously converted to their binary equivalents. Furthermore, it is clear that this system is not limited to the translating of a decimal to a binary number but may be employed to translate any number expressed in one radix to that of a second radix.

Since these and many other variations may be made by those skilled in the art without departing from the true spirit and scope of the present invention, this invention is to be considered as limited only in accordance with the following claims.

I claim:

1. In a converter for translating a given number expressed in a higher base number to that of a lower base number, an accumulator having a plurality of cascaded stages, one for each power of the second base, a plurality of transmitting means, one for each power of the first base contained in said given number, with each transmitting means being interconnected with preselected ones of said stages and adapted to transmit impulses to said preselected stages for translating said power of the first base into a sum of powers of the second base equal thereto, a plurality of predetermined counters, one for counting the number of energizations of each transmitting means and each being presettable to count a different digit of the given number when expressed in said first base, and a programming means for energizing all of said transmitting means in sequence and being responsive to said predetermined counters for repetitively energizing each of said transmitting means a number of instances corresponding to the preset digit of the predetermined counter associated therewith.

2. In a converter for translating a given number expressed in a higher base number to a lower base number, an accumulator having a plurality of cascaded stages, one for each integral power of the lower base, a plurality of transmitting means, one for each integral power of the higher base contained in said given number with each transmitting means being interconnected with preselected ones of said stages and adapted to transmit impulses to said preselected stages for translating said power of the higher base into a sum of powers of the lower base equal thereto, a plurality of predetermined counters including a different one for counting the number of energizations of each transmitting means and each being presettable to a different digit of the given number in the first base to be converted and adapted to transmit a control impulse after receiving said preset number of energizations, and a programming means for energizing each of said transmitting means in sequence and responsive to said control impulses from all of said predetermined counters for repetitively energiz'ng each of said transmitting means a number of instances corresponding to the preset digit of the counter associated therewith.

3. In the apparatus of claim 2, said programming means including a switching means responsive to a recurring pulse source for selectively directing groups of said recurring pulses to each one of said transmitting means in cyclic sequence and being responsive to the control impulses from each of said predetermined counters for switching from one transmitting means to the next.

4. In a converter for translating a number expressed in a higher base number to a lower base number, an accumulator having a plurality of cascaded stages, one for each integral power of said lower base number, a plurality of transmitting means one for each integral power of the first base contained in said number with each transmitting means being interconnected with preselected ones of said stages and adapted to transmit impulses to said preselected stages for translating said power of the first base into a sum of powers of the second base equal thereto, a plurality of predetermined counters including a different one for counting the number of energizations of each transmitting means and each being presettable to a different digit of the first base number to be converted and adapted to transmit a control impulse after receiving said predetermined number of energizations, and a programming means for energizing each of said transmitting means in sequence and responsive to said control pulses for repetitively energizing each of said transmitting means a number of instances corresponding to the presetting of the counter associated therewith.

5. In a decimal to binary radix converter, a binary accumulator having a plurality of cascaded counting stages, one for each power of the binary base 2, a plurality of transmitting means, one for each power of the decimal base 10 with each transmitting means being interconnected with preselected ones of said stages and adapted to transmit input impulses thereto to enter the binary equivalent of that power of base 10 therein, means for repetitively energizing the highest power transmitting means a number of instances corresponding to the decimal digit associated with that power to be translated, said means operative after said highest power energizations have been completed for energizing said second highest power transmitting means a number of instances corresponding to the decimal digit associated with that latter power to be translated and thereafter operative to energize each of said next-in-order lower power transmitting means a number of instances corresponding to the decimal digits associated with those powers, with each transmitter being energized in time sequence after the preceding transmitter has completed its series of operations, a plurality of predetermined counters including a different one for counting the number of energizations of each transmitting means and each being presettable to a different digit of the decimal number to be converted and adapted to transmit a control impulse after receiving said predetermined number of counts, and said repetitive energizing means being responsive to the control impulses from each of said predetermined counters for switching said energizing means from one transmitting means to another after completion of each of the various predetermined number of counts.

6. In a decimal to binary radix converter, a binary accumulator having a plurality of cascaded binary stages, one for each power of the binary base 2, a plurality of networks one for each power of the decimal base 10 with each network being interconnected with preselected ones of said stages and adapted to transmit input impulses thereto to enter the binary equivalent of that power of base 10 therein, a plurality of predetermined counters including a different one for counting the number of energizations of each transmitting means and each counter being presettable to a different digit of a given decimal number to be converted and adapted to transmit a control impulse after receiving said predetermined number of counts, and a programming means for energizing each of said transmitting means in sequence and being responsive to said predetermined counters for repetitively energizing each of said transmitting means a number of instances corresponding to the presetting of the counter associated therewith.

7. In the apparatus of claim 6 said programming means including a switching means responsive to a recurring pulse source for selectively directing groups of impulses to each of said transmitting means in turn and being responsive to the control impulses from said predetermined counters for switching from one transmitting means to the next.

8. In a converter for translating a number expressed in one radix to that of a second radix, a summing accumulator having a plurality of cascaded stages, one for each power of the second radix, a plurality of networks, one for each power of the first radix with each network being interconnected with preselected different ones of said stages and adapted to transmit impulses to said preselected stages for translating each power of the first radix into the various powers of the second radix having a sum equal thereto, a plurality of counter means for counting the number of impulses transmitted by each said network, and means under control of said plurality of counter means for repetitively energizing each of said networks sequentially a number of times corresponding to the digit of that power of the first radix to be translated, whereby the resulting sum in said accumulator after all energizations have been completed equals the second radix form of said number.

9. In a decimal to binary radix converter, a binary accumulator having a plurality of cascaded counting stages, one for each power of the binary base 2, a plurality of transmitting means, one for each power of the decimal base 10 with each transmitting means being interconnected with preselected ones of said stages and adapted to transmit input impulses thereto to enter the binary equivalent of that power of base 10 therein, a plurality of counter means for counting the number of impulses transmitted by each said transmitting means, means under control of said plurality of counter means for repetitively energizing the highest power transmitting means a number of instances corresponding to the decimal digit associated therewith to be translated, said plurality of counter means controlling said repetitive energizing means after said highest power energizations have been completed to thereby energize said second highest power transmitting means a number of instances corresponding to the decimal digit associated therewith to be translated, and thereafter to energize said next-in-order lower power transmitting means a number of instances corresponding to the decimal digits associated with those powers with each transmitting means being energized in sequence after the preceding transmitter has completed its series of operations.

10. In the apparatus of claim 9, said repetitive energizing means including a switching means adapted to be energized by a recurring pulse source and to selectively direct a preselected number of said recurring impulses to each of said transmitting means, said plurality of counter means including a plurality of predetermined counters one for each transmitting means and each being presettable to a different digit of the decimal number, and said switching means being responsive to said predetermined counters for determining the number of said recurring impulses being directed to each of said transmitting means.

11. In a translating device for converting a multi-order decimal number into its binary form, a binary summation means, a plurality of pulse transmitting means connected to said summation means with each said transmitting means being adapted on each energization thereof to enter the binary equivalent of a different order of the multi-order decimal number into said summation means in additive relation, a plurality of counter means for counting the number of energizations of each of said transmitting means, and means under control of said plurality of counting means for repetitively energizing each of said transmitting means a number of times corresponding to the decimal digit of that order to be converted.

12. In a converter for translating a number expressed in one radix into a second radix by converting each order of a number in the first radix to the equivalent number form of that order in the second radix and summing all such equivalent numbers in the second radix, means including a plurality of impulse transmitting means each adapted to transmit signals in the coded form of the second radix representing a different consecutive power of the first radix, means for summing signals from all of said transmitting means, a plurality of counting means for counting the number of impulses transmitted by each of said transmitting means, and energizing means responsive to control signals from said plurality of counting means for sequentially energizing each of said transmitting means in turn a repetitive number of times corresponding to the digit number of that order.

References Cited in the file of this patent

UNITED STATES PATENTS 2,401,621 Desch et al. ------------ June 4, 1946